(12) United States Patent
Heuler et al.

(10) Patent No.: US 8,401,893 B1
(45) Date of Patent: Mar. 19, 2013

(54) ASSESSMENT CONSTRUCTION TOOL

(75) Inventors: Randal J. Heuler, McMurray, PA (US); Christopher Ropar, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 259 days.

(21) Appl. No.: 12/764,449

(22) Filed: Apr. 21, 2010

(51) Int. Cl.
*G06Q 10/00* (2012.01)
(52) U.S. Cl. ........................ 705/7.41; 705/7.36
(58) Field of Classification Search .................. 705/7.36, 705/7.41
See application file for complete search history.

(56) References Cited

U.S. PATENT DOCUMENTS

| | | | |
|---|---|---|---|
| 5,737,494 A * | 4/1998 | Guinta et al. | 706/47 |
| 6,092,060 A * | 7/2000 | Guinta et al. | 706/47 |
| 6,093,026 A * | 7/2000 | Walker et al. | 434/322 |
| 6,161,101 A * | 12/2000 | Guinta et al. | 706/45 |
| 6,526,423 B2 | 2/2003 | Zawadzki et al. | |
| 6,675,149 B1 * | 1/2004 | Ruffin et al. | 705/7.12 |
| 6,705,872 B2 | 3/2004 | Pearson et al. | |
| 6,850,892 B1 | 2/2005 | Shaw | |
| 7,167,844 B1 | 1/2007 | Leong et al. | |
| 7,496,527 B2 * | 2/2009 | Silverstein et al. | 705/26.8 |
| 7,680,682 B2 * | 3/2010 | Jessup et al. | 705/7.38 |
| 7,693,724 B2 | 4/2010 | Bryant | |
| 7,693,738 B2 * | 4/2010 | Guinta et al. | 705/7.32 |
| 7,885,841 B2 * | 2/2011 | King | 1/1 |
| 7,921,031 B2 * | 4/2011 | Crysel et al. | 705/7.32 |
| 2001/0032195 A1 | 10/2001 | Graichen et al. | |
| 2002/0052774 A1 * | 5/2002 | Parker et al. | 705/10 |
| 2002/0059093 A1 * | 5/2002 | Barton et al. | 705/10 |
| 2002/0194055 A1 | 12/2002 | Takakura et al. | |
| 2003/0101086 A1 * | 5/2003 | San Miguel | 705/9 |
| 2003/0126049 A1 * | 7/2003 | Nagan et al. | 705/35 |
| 2003/0158800 A1 | 8/2003 | Pisello et al. | |
| 2004/0015376 A1 * | 1/2004 | Zhu et al. | 705/7 |
| 2004/0148210 A1 | 7/2004 | Barrett et al. | |
| 2005/0004823 A1 | 1/2005 | Hnatio | |
| 2005/0071185 A1 | 3/2005 | Thompson | |
| 2005/0193333 A1 * | 9/2005 | Ebert | 715/517 |
| 2005/0209897 A1 | 9/2005 | Luhr | |
| 2005/0272022 A1 * | 12/2005 | Montz et al. | 434/322 |
| 2006/0089861 A1 | 4/2006 | King et al. | |
| 2006/0117388 A1 | 6/2006 | Nelson et al. | |
| 2006/0149604 A1 | 7/2006 | Miller | |
| 2006/0155611 A1 | 7/2006 | Hoffenberg | |
| 2006/0240394 A1 * | 10/2006 | Smith et al. | 434/322 |
| 2007/0088602 A1 | 4/2007 | Yaskin et al. | |
| 2007/0202483 A1 | 8/2007 | Castelli et al. | |
| 2007/0244743 A1 * | 10/2007 | Vegliante et al. | 705/11 |
| 2007/0282666 A1 | 12/2007 | Afeyan et al. | |
| 2008/0140485 A1 * | 6/2008 | Williams | 705/7 |

(Continued)

OTHER PUBLICATIONS

Rubin, Howard. Measure for Measure. Computerworld: Apr. 15, 1991; 25, 15; ProQuest Central.*

(Continued)

*Primary Examiner* — Johnna Loftis
(74) *Attorney, Agent, or Firm* — Buchanan Ingersoll & Rooney PC; Robert J. Pugh

(57) ABSTRACT

An assessment construction tool is provided for developing and executing assessments of various operational aspects of a business entity. Both application-level and project-level assessments may be constructed, and the assessments include a mechanism for applying scores associated with answers derived from conducting the assessment to multiple assessment process categories of the business entity.

17 Claims, 25 Drawing Sheets

U.S. PATENT DOCUMENTS

2009/0119141 A1      5/2009   McCalmont et al.
2009/0216628 A1*     8/2009   Pandey et al. .................. 705/11
2010/0100427 A1*     4/2010   McKeown et al. .............. 705/11
2010/0153156 A1*     6/2010   Guinta et al. .................... 705/8
2010/0287036 A1*    11/2010   Guinta et al. .................. 705/10

OTHER PUBLICATIONS

U.S. Appl. No. 12/764,430, filed Apr. 21, 2010.
U.S. Appl. No. 12/764,444, filed Apr. 21, 2010.
Office Action dated Mar. 27, 2012 for U.S. Appl. No. 12/764,430, filed Apr. 21, 2010.
Kathlene Larson, Verne Ryan, "A Tool for Developing Questionnaire Content," *Journal of Extension*, Oct. 2003, vol. 41, No. 5, printed from http://www.joe.org/joe/2003october/tt3.php, Internet site, accessed on Apr. 17, 2012, 3 pages.
"Online survey and questionnaire tool," Rages Ltd Extranet, Rages Ltd., 2005, 1 page.

\* cited by examiner

*RISK ASSESSMENTS*

- SERVICES
- PROJECT MANAGER
- APPLICATION SYSTEMS MANAGER
- SYSTEM DIRECTOR
- CIO
- ALL ASSESSMENTS
  - ALL
  - BY RATING
  - BY QUESTION ANSWER
  - PROJECTS W/O MNEMONIC
  - APPROVED ASSESSMENTS
  - PENDING APPROVAL
  - COMPLETE ASSESSMENTS
  - INCOMPLETE ASSESSMENTS
- RISK QUESTIONS
- ADMINISTRATION
  - ASSESSMENT BUILDER

| MNEMONIC | ASSESSMENT TYPE | NAME | DETAILS | SOX |
|---|---|---|---|---|
| ▶ AAC | APPLICATION | AAA CONSUMER WEBSITE | % .00 COMPLETE STATUS = OPEN | NO |
| ▶ AAS | APPLICATION | AAA FSB WEBSITE | % .00 COMPLETE STATUS = OPEN | NO |
| ▶ AAT | APPLICATION | AML APPLICATIONS TEAM | % 68.75 COMPLETE STATUS = OPEN | NO |
|  | PRJ00004324 |  | % 0.00 COMPLETE STATUS = NEW | CURRENT: APPROVED: |
| ▶ ABC | APPLICATION | ACTIVITY BASED COSTING | % 68.75 COMPLETE STATUS = OPEN | NO |
|  | PRJ00002852 |  | % 0.00 COMPLETE STATUS = NEW | CURRENT: APPROVED: |
|  | PRJ00005916 |  | % 0.00 COMPLETE STATUS = NEW | CURRENT: APPROVED: |
|  | PRJC0001147 |  | % 0.00 COMPLETE STATUS = NEW | CURRENT: APPROVED: |

*FIG.2A*

QUESTION REPOSITORY
MNEMONIC QUESTIONS
ANSWER ATTRIBUTES
SCORING CATEGORIES
QUESTION GROUPS
NOTIFICATION ROLES
APPROVAL DEFINITIONS
APPROVAL DELEGATIONS

▶ ABL

| | APPLICATION | ASSET BASED LENDING | % 100.00 COMPLETE STATUS = NEEDS SUBMITTED | CURRENT: APPROVED: | YES |
|---|---|---|---|---|---|
| A | INC00022962 | | % 69.23 COMPLETE STATUS = OPEN | CURRENT: APPROVED: | |
| | PRJ00004198 | | % 0.00 COMPLETE STATUS = NEW | CURRENT: APPROVED: | |
| | PRJC0001423 | | % 0.00 COMPLETE STATUS = NEW | CURRENT: APPROVED: | |
| | PRJC0002072 | | % 0.00 COMPLETE STATUS = NEW | CURRENT: APPROVED: | |
| | PRJC0002094 | | % 0.00 COMPLETE | CURRENT: | |

| CATEGORY | QUESTION | # | ASSESSMENT TEMPLATE |
|---|---|---|---|
| | (A) DOES THIS APPLICATION (MNEMONIC) CONTAIN CONSUMER OR EMPLOYEE SSN, ACCOUNT NUMBER, DRIVER'S LICENSE NUMBER, PIN OR PASSWORD INFORMATION? | 0 | P QUESTION: DESCRIBE THE MAGNITUDE OF CHANGE REPRESENTED BY THIS INITIATIVE. |
| | | 1 | P - - - ANSWER: NONE |
| | (A) DOES THIS APPLICATION (MNEMONIC) HAVE THE CAPABILITY TO READ, COPY OR MODIFY CONSUMER OR EMPLOYEE DATA (NAME, ADDRESS, PHONE NUMBER, SSN, ACCOUNT NUMBER OR DRIVER'S LICENSE NUMBER) FOR 50,000 OR MORE RECORDS OR THE ENTIRE FILE THROUGH THE EXECUTION OF A SINGLE TRANSACTION? | 2 | P - - - ANSWER: CHANGES TO AN EXISTING APPLICATION |
| | | 3 | P - - - ANSWER: CHANGES TO AN EXISTING SYSTEM (NOT AN APPLICATION) |
| | | 4 | P - - - ANSWER: IMPLEMENTATION OF A NEW APPLICATION; A NEW MNEMONIC WILL BE NEEDED |
| | | 5 | P - - - ANSWER: IMPLEMENTATION OF A NEW SYSTEM (NOT AN APPLICATION) |
| | (A) DOES THIS APPLICATION (MNEMONIC) HAVE THE CAPABILITY TO TRANSFER INTERNALLY OR EXTERNALLY $5 MILLION OR GREATER THROUGH A SINGLE EXECUTION OF ANY TRANSACTION? | 6 | P - - - ANSWER: MODIFICATIONS AND/OR ADDITIONS TO MULTIPLE APPLICATIONS AND/OR SYSTEMS |
| | | 7 | P - - - ANSWER: UNKNOWN AT THIS TIME, TO BE DETERMINED |
| | (A) DOES THIS APPLICATION (MNEMONIC) CONTAIN HEALTH OR MEDICAL RELATED INFORMATION? | 8 | P QUESTION: WILL NEW HARDWARE TECHNOLOGY PRODUCTS BE REQUIRED FOR THIS INITIATIVE? |
| | (P) DESCRIBE THE INVOLVEMENT OF THIRD PARTIES TO THIS INITIATIVE. | 9 | P - - - ANSWER: UNKNOWN AT THIS TIME |
| | | 10 | P - - - ANSWER: NO, AS ONLY EXISTING STANDARD TECHNOLOGY PRODUCTS WILL BE USED (NOTHING TO BUY) |
| | (P) DESCRIBE THE MAGNITUDE OF CHANGE REPRESENTED BY THIS INITIATIVE. | 11 | P - - - ANSWER: NO, HOWEVER ADDITIONAL STANDARD TECHNOLOGY PRODUCTS WILL MAY NEED TO BE PURCHASED OR LEASED |
| | (P) DOES THIS INITIATIVE HAVE A TECHNICAL LEAD OR AN ARCHITECT? | | |

FIG. 3A

| | | | |
|---|---|---|---|
| ▶ THIRD PARTIES | (A) WHICH IS THE PRIMARY PLATFORM ON WHICH THIS APPLICATION/TECHNOLOGY RESIDES? | 12 | P --- ANSWER: YES, NEW (NOT CURRENTLY STANDARD) TECHNOLOGY PRODUCTS WILL/MAY NEED TO BE ACQUIRED |
| | (P) DESCRIBE THE USE OF OFFSHORE RESOURCES | 13 | P --- QUESTION: DESCRIBE THE INVOLVEMENT OF THIRD PARTIES TO THIS INITIATIVE. |
| | (P) DESCRIBE THE VENDOR ASSISTING WITH THIS INITIATIVE | 14 | P --- ANSWER: NONE - ALL WORK WILL BE COMPLETED BY PNC EMPLOYEES |
| ▶ TIA PHASE 2 | (A) IF THIS APPLICATION WAS UNAVAILABLE, WOULD THE OUTAGE HAVE ADVERSE IMPACT TO THE OPERATION OF A BUSINESS FUNCTION THAT PLAYS A CRITICAL PART IN THE US | 15 | P --- ANSWER: LIMITED - ALL WORK WILL BE COMPLETED BY PNC EMPLOYEES AND CONTRACT EMPLOYEES |
| | | 16 | P --- ANSWER: SOME - WORK WILL BE COMPLETED BY BOTH PNC EMPLOYEES AND EMPLOYEES OF SERVICE PARTNERS, VENDORS, OR OTHER NON - PNC EMPLOYEES |

| EDIT | CLOSE |

REPOSITORY | LOG | HELP

CSD REPOSITORY QUESTION

SURVEY TYPE — 404
○ APPLICATION  ● PROJECT

QUESTION GROUP — 406
NONE

REQUIRED FOR MNEMONIC
● NO  ○ YES

PURPOSE — 408

QUESTION — 402
DESCRIBE THE INVOLVEMENT OF THIRD PARTIES TO THIS INITIATIVE.

ANSWERS — 410
NONE - ALL WORK WILL BE COMPLETED BY PNC EMPLOYEES
LIMITED - ALL WORK WILL BE COMPLETED BY PNC EMPLOYEES AND CONTRACT EMPLOYEES
SOME - WORK WILL BE COMPLETED BY BOTH PNC EMPLOYEES AND EMPLOYEES OF SERVICE PARTNERS, VENDORS, OR OTHER NON-PNC EMPLOYEES
SIGNIFICANT - PNC WILL MANAGE NON-PNC RESOURCES WHO WILL PERFORM THE MAJORITY OF THE WORK
SIGNIFICANT - PNC WILL BE USING OR IMPLEMENTING A PRODUCT OR SERVICE THAT WAS

| EDIT | CLOSE |

| CSD QUESTION GROUP ||
|---|---|
| 602— GROUP NAME | THIRD PARTIES |
| DESCRIPTION | THIRD PARTIES |
| 604— TRIGGER TYPE | ○ SCORING CATEGORY  ⊙ ANSWER |

*FIG.6*

✗ CLOSE

| ASSESSMENT TYPE: | APPLICATION ||
|---|---|---|
| STATUS: | OPEN  93.75% COMPLETED QUESTIONS ||
| MNEMONIC | APPLICATION NAME ||
| AAT | AML APPLICATIONS TEAM ||

| ASSESSMENT | RATINGS | LOG | APPROVALS | APPLICATION INFO. |

| 702 | SCORE | ACTIVE RATING | APPROVED RATING |
|---|---|---|---|
| SOX | NO | | |
| RESILIENCY | 0 | NON-CRITICAL | |
| RISK TRIGGER | 0 | LOW | |
| TECHNICAL RISK | 0 | | |
| ARCHITECTURE RATING | 0 | | |

AAT-APPLICATION       704        706        708

*FIG.7*

RISK ASSESSMENTS

- SERVICES
- PROJECT MANAGER
- APPLICATION SYSTEMS MANAGER
- SYSTEM DIRECTOR
- CIO
- ALL ASSESSMENTS
  - ALL
  - BY RATING
  - BY QUESTION ANSWER
  - PROJECTS W/O MNEMONIC
  - APPROVED ASSESSMENTS
  - PENDING APPROVAL
  - COMPLETE ASSESSMENTS
  - INCOMPLETE ASSESSMENTS
- RISK QUESTIONS
- ADMINISTRATION
  - ASSESSMENT BUILDER
  - QUESTION REPOSITORY
  - MNEMONIC QUESTIONS
  - ANSWER ATTRIBUTES
  - SCORING CATEGORIES
  - QUESTION GROUPS
  - NOTIFICATION ROLES
  - APPROVAL DEFINITIONS
  - APPROVAL DELEGATIONS

[CREATE GROUP]

| GROUP NAME | SCORING CATEGORY | TRIGGER |
|---|---|---|
| HARDWARE TECHNOLOGIES | | |
| THIRD PARTIES | | |
| TIA PHASE 2 ~902 | TIA PHASE 1 ~904 | CRITICAL |

*FIG. 9*

RISK ASSESSMENTS

- SERVICES
- PROJECT MANAGER
- APPLICATION SYSTEMS MANAGER
- SYSTEM DIRECTOR
- CIO
- ALL ASSESSMENTS
  - ALL
  - BY RATING
  - BY QUESTION ANSWER
  - PROJECTS W/O MNEMONIC
  - APPROVED ASSESSMENTS
  - PENDING APPROVAL
  - COMPLETE ASSESSMENTS
  - INCOMPLETE ASSESSMENTS
- RISK QUESTIONS
- ADMINISTRATION
  - ASSESSMENT BUILDER
  - QUESTION REPOSITORY
  - MNEMONIC QUESTIONS
  - ANSWER ATTRIBUTES
  - SCORING CATEGORIES
  - QUESTION GROUPS
  - NOTIFICATION ROLES
  - APPROVAL DEFINITIONS
  - APPROVAL DELEGATIONS

| CREATE CATEGORY 1002 | SCORE METHOD 1004 |
|---|---|
| CATEGORY | SCORE METHOD |
| AAR | NUMERIC THRESHOLD |
| IPV | NUMERIC THRESHOLD |
| TIA PHASE 1 | NUMERIC THRESHOLD |
| TIA PHASE 2 | NUMERIC THRESHOLD |

*FIG. 10*

RISK ASSESSMENTS

- SERVICES
- PROJECT MANAGER
- APPLICATION SYSTEMS MANAGER
- SYSTEM DIRECTOR
- CIO
- ALL ASSESSMENTS
  - ALL
  - BY RATING
  - BY QUESTION ANSWER
  - PROJECTS W/O MNEMONIC
  - APPROVED ASSESSMENTS
  - PENDING APPROVAL
  - COMPLETE ASSESSMENTS
  - INCOMPLETE ASSESSMENTS
- RISK QUESTIONS
- ADMINISTRATION
  - ASSESSMENT BUILDER
  - QUESTION REPOSITORY
  - MNEMONIC QUESTIONS
  - ANSWER ATTRIBUTES
  - SCORING CATEGORIES
  - QUESTION GROUPS
  - NOTIFICATION ROLES
  - APPROVAL DEFINITIONS
  - APPROVAL DELEGATIONS

[CREATE ROLE] /1102

| ROLE NAME | TYPE |
|---|---|
| ASM | LOOKUP |
| ENTERPRISE ARCHITURE | NAME |
| KING | NAME |
| QUEEN | NAME |
| ROPAR | NAME |

*FIG. 11*

CSD NOTIFICATION NOTE

| ROLE NAME | DESCRIPTION |
|---|---|
| ⌜KING⌟ | ⌜KING⌟ |
| ROLE TYPE | |
| ⦿ NAME  ○ LOOKUP | |
| MEMBERS | |
| ⌜CHRISTOPHER ROPAR/NON-EMPLOYEE/PNCADVISORS/PGH/PNC⌟ ▼ | |

*FIG.12*

CSD APPROVAL DEFINITION

| DEFINITION NAME | APPLICATION ASSESSMENT |
|---|---|
| DESCRIPTION | |
| FIRST LEVEL APPROVER | KING |
| SECOND LEVEL APPROVER | |
| THIRD LEVEL APPROVER | |
| FOURTH LEVEL APPROVER | |
| FIFTH LEVEL APPROVER | |

*FIG.13*

| SAVE | CLOSE |
|---|---|

| CSD APPROVER DELEGATION ||
|---|---|
| ROLE | ⌐⌐▼ |
| ORIGINAL APPROVER | ⌐⌐▼ |
| DELEGATED TO | ⌐⌐▼ |

*FIG.14*

✗ CLOSE

| ASSESSMENT TYPE: | APPLICATION |
|---|---|
| STATUS: | OPEN 93.75% COMPLETED QUESTIONS |
| MNEMONIC<br>AAT | APPLICATION NAME<br>AML APPLICATIONS TEAM |

| ASSESSMENT | RATINGS | LOG | APPROVALS | APPLICATION INFO. |
|---|---|---|---|---|

| ASSESSMENT APPROVAL STATUS | | | | |
|---|---|---|---|---|
| | APPROVER | STATUS | | |
| 1ST APPROVER(S) | | SURVEY INCOMPLETE | APPROVE | REJECT |
| 2ND APPROVER(S) | | SURVEY INCOMPLETE | APPROVE | REJECT |
| 3RD APPROVER(S) | | SURVEY INCOMPLETE | APPROVE | REJECT |
| 4TH APPROVER(S) | | SURVEY INCOMPLETE | APPROVE | REJECT |
| 5TH APPROVER(S) | | SURVEY INCOMPLETE | APPROVE | REJECT |
| | | | | |

| MNEMONIC APPROVAL STATUS: COMPLETE |
|---|

| RISK ASSESSMENTS | NEW ATTRIBUTE | 1702 | |
|---|---|---|---|
| | | ATTRIBUTE | DESCRIPTION |
| ☐ SERVICES | | FINANCIAL | THE APPLICATION HAS THE CAPABILITY TO TRANSFER INTERNALLY OR EXTERNALLY $5M VIA A SINGLE TRANSACTION |
| ☐ PROJECT MANAGER | | HEALTH | THE APPLICATION CONTAINS HEALTH OR MEDICAL RELATED INFORMATION |
| ☐ APPLICATION SYSTEMS MANAGER | | INFORMATION REPOSITORY | THE APPLICATION CONTAINS CONSUMER OR EMPLOYEE INFORMATION |
| ☐ SYSTEM DIRECTOR | | OFFSHORE RESOURCES | OFFSHORE RESOURCES |
| ☐ CIO | | TRANSACTIONAL | THE APPLICATION HAS THE CAPABILITY MODIFY CONSUMER OR EMPLOYEE FOR 50,000 OR MORE RECORDS THROUGH A SINGLE TRANSACTION. |
| ☐ ALL ASSESSMENTS | | | |
|    ALL | | | |
|    BY RATING | | | |
|    BY QUESTION ANSWER | | | |
|    PROJECTS W/O MNEMONIC | | | |
|    ☐ APPROVED ASSESSMENTS | | | |
|    ☐ PENDING APPROVAL | | | |
|    ☐ COMPLETE ASSESSMENTS | | | |
|    ☐ INCOMPLETE ASSESSMENTS | | | |
| ☐ RISK QUESTIONS | | | |
| ☐ ADMINISTRATION | | | |
|    ASSESSMENT BUILDER | | | |
|    QUESTION REPOSITORY | | | |
|    MNEMONIC QUESTIONS | | | |
|    ANSWER ATTRIBUTES | | | |
|    SCORING CATEGORIES | | | |
|    QUESTION GROUPS | | | |
|    NOTIFICATION ROLES | | | |
|    APPROVAL DEFINITIONS | | | |
|    APPROVAL DELEGATIONS | | | |

FIG. 17

| ATTRIBUTE | MNEMONIC | PROJECT | NAME |
|---|---|---|---|
| ▼ FINANCIAL | | | |
| | ▶ AAT | PRJ00004324 | TEST IT MINOR - CANCEL |
| | ▶ ABL | APPLICATION | ASSET BASED LENDING |
| ▼ HEALTH | | | |
| | ▶ AAT | PRJ00004324 | TEST IT MINOR - CANCEL |
| | ▶ ABL | APPLICATION | ASSET BASED LENDING |
| ▼ INFORMATION REPOSITORY | | | |
| | ▶ AAT | PRJ00004324 | TEST IT MINOR - CANCEL |
| | ▶ ABL | APPLICATION | ASSET BASED LENDING |
| ▼ TRANSACTIONAL | | | |
| | ▶ AAT | PRJ00004324 | TEST IT MINOR - CANCEL |
| | ▶ ABL | APPLICATION | ASSET BASED LENDING |

1802

RISK ASSESSMENTS

☐ SERVICES
    REQUEST NEW MNEMONIC
☐ PROJECT MANAGER
☐ APPLICATION SYSTEMS MANAGER
☐ SYSTEM DIRECTOR
☐ CIO
▷ ALL ASSESSMENTS
    ALL
    BY RATING
    BY QUESTION ANSWER
    PROJECTS W/O MNEMONIC
    ☐ APPROVED ASSESSMENTS
    ☐ PENDING APPROVAL
    ☐ COMPLETE ASSESSMENTS
    ☐ INCOMPLETE ASSESSMENTS
☐ RISK QUESTIONS
▷ ADMINISTRATION
    ASSESSMENT BUILDER
    QUESTION REPOSITORY
    MNEMONIC QUESTIONS
    ANSWER ATTRIBUTES
    SCORING CATEGORIES
    QUESTION GROUPS
    NOTIFICATION ROLES
    APPROVAL DEFINITIONS
    APPROVAL DELEGATIONS

*FIG. 18*

DISPOSITION: ANSWERED STATUS:

| CSD QUESTION | DETAILS | LOG | APPROVAL LOG | HELP |
|---|---|---|---|---|

| DATE | PROCESS | |
|---|---|---|
| 01/31/2008 01:33:57 PM | ANSWER QUESTION | THIS QUESTION WAS ANSWERED WITH THE FOLLOWING VALUE: MULTIPLE |

NEXT △   ⬇ EXIT

*FIG. 19*

DISPOSITION: INCOMPLETE STATUS:

| CSD QUESTION | DETAILS | LOG | APPROVAL LOG | HELP |

CSD SURVEY QUESTION #1

DESCRIBE THE MAGNITUDE OF CHANGE REPRESENTED BY THIS INITIATIVE.

SELECT YOUR ANSWER

NONE
CHANGES TO AN EXISTING APPLICATION
CHANGES TO AN EXISTING SYSTEM (NOT AN APPLICATION)
IMPLEMENTATION OF A NEW APPLICATION; A NEW MNEMONIC WILL BE NEEDED
IMPLEMENTATION OF A NEW SYSTEM (NOT AN APPLICATION)
MODIFICATIONS AND/OR ADDITIONS TO MULTIPLE APPLICATIONS AND/OR SYSTEMS
UNKNOWN AT THIS TIME, TO BE DETERMINED

YOUR ANSWER

EXPLANATION OR ATTACHMENTS

[ NEXT ▷ ]  [ ⬆ EXIT ]

FIG.20A

DISPOSITION: INCOMPLETE STATUS:

| CSD QUESTION | DETAILS | LOG | APPROVAL LOG | HELP |

CSD SURVEY QUESTION # 3

DESCRIBE THE INVOLVEMENT OF THIRD PARTIES TO THIS INITIATIVE.

SELECT YOUR ANSWER

NONE - ALL WORK WILL BE COMPLETED BY PNC EMPLOYEES
LIMITED - ALL WORK WILL BE COMPLETED BY PNC EMPLOYEES AND CONTRACT EMPLOYEES
SOME - WORK WILL BE COMPLETED BY BOTH PNC EMPLOYEES AND EMPLOYEES OF SERVICE PARTNERS, VENDORS, OR OTHER NON-PNC EMPLOYEES
SIGNIFICANT - PNC WILL MANAGE NON-PNC RESOURCES WHO WILL PERFORM THE MAJORITY OF THE WORK
SIGNIFICANT - PNC WILL BE USING OR IMPLEMENTING A PRODUCT OR SERVICE THAT WAS DEVELOPED BY ANOTHER COMPANY OR INDIVIDUAL
SIGNIFICANT, THE INITIATIVE INVOLVES THE IMPLEMENTATION OF COMMERCIAL OFF THE SHELF SOFTWARE (COTS)
TOTAL - ALL OF THE WORK WILL BE COMPLETED BY NON-PNC EMPLOYEES

YOUR ANSWER

EXPLANATION OR ATTACHMENTS

[ ◁ PREVIOUS ]  [ NEXT ▷ ]  [ ⇧ EXIT ]

*FIG.20B*

DISPOSITION: ANSWERED STATUS:

| CSD QUESTION | DETAILS | LOG | APPROVAL LOG | HELP |

CSD SURVEY QUESTION # 1

WHICH IS THE PRIMARY PLATFORM ON WHICH THIS APPLICATION/TECHNOLOGY RESIDES?

SELECT YOUR ANSWER eTECHNOLOGY
DISTRIBUTED - NT
DISTRIBUTED - LINUX/UNIX/*NIX
DISTRIBUTED - DOMINO
DISTRIBUTED - OTHER
UNKNOWN AT THIS TIME
MULTIPLE

YOUR ANSWER
MULTIPLE

EXPLANATION OR ATTACHMENTS

NEXT ▷    ⬆ EXIT

*FIG. 20C*

DISPOSITION: INCOMPLETE   STATUS: NEEDS CERTIFIED

| CSD QUESTION | DETAILS | LOG | APPROVAL LOG | HELP |

CSD SURVEY QUESTION # 8

ENTERPRISE IMPACT IS: THE RATIO OF THE ACTUAL OUTPUT OF AN APPLICATION OR TECHNOLOGY COMPARED TO THE STANDARD OR PLANNED OUTPUT; I.E., UNAVAILABILITY OF APPLICATIONS OR SYSTEMS THAT COULD IMPACT THE ABILITY TO MANAGE FUNDS.

IF THE APPLICATION WERE UNAVAILABLE, WHEN WOULD PNC'S OPERATING EFFICIENCY WITHIN THE ENTERPRISE BE IMPACTED?

SELECT YOUR ANSWER

NEVER
0-5 HOURS
5-24 HOURS
24-48 HOURS
>48 HOURS
UNKNOWN

YOUR ANSWER
> 48 HOURS

[ ✓ CERTIFY ANSWER AND NEXT ]

EXPLANATION OR ATTACHMENTS

[ ◁ PREVIOUS ]   [ NEXT ▷ ]   [ ⇱ EXIT ]

*FIG.20D*

DISPOSITION: ANSWERED STATUS:

| CSD QUESTION | DETAILS | LOG | APPROVAL LOG | HELP |

CSD SURVEY QUESTION # 19

DOES THIS APPLICATION (MNEMONIC) CONTAIN CONSUMER OR EMPLOYEE NAME, ADDRESS AND / OR PHONE NUMBER?

SELECT YOUR ANSWER

NO
YES

YOUR ANSWER
YES

EXPLANATION OR ATTACHMENTS

◁ PREVIOUS   NEXT △   ⇱ EXIT

*FIG. 20E*

| MNEMONIC | APPLICATION NAME | PROJECT NUMBER | PROJECT NAME |
| --- | --- | --- | --- |
| AAT | | PRJ00004324 | TEST IT MINOR - CANCEL |

| ASSESSMENT | RATINGS | LOG | APPROVALS | PROJECT INFO. |
| --- | --- | --- | --- | --- |

⟳ REFRESH

*LEGEND*

| X = INCOMPLETE | —— COMPLETE | —— PENDING APPROVAL | --- REJECTED | *APPROVED |
| --- | --- | --- | --- | --- |

001) DESCRIBE THE MAGNITUDE OF CHANGE REPRESENTED BY THIS INITIATIVE. ☐
CHANGES TO AN EXISTING APPLICATION

002) WILL NEW HARDWARE TECHNOLOGY PRODUCTS BE REQUIRED FOR THIS INITIATIVE? ☐
NO, AS ONLY EXISTING STANDARD TECHNOLOGY PRODUCTS WILL BE USED (NOTHING TO BUY)

003) DESCRIBE THE INVOLVEMENT OF THIRD PARTIES TO THIS INITIATIVE. ☐
SIGNIFICANT - PNC WILL MANAGE NON-PNC RESOURCES WHO WILL PERFORM THE MAJORITY OF THE WORK

004) X DESCRIBE THE USE OF OFF SHORE RESOURCES ☐

005) X DESCRIBE THE VENDOR ASSISTING WITH THIS INITIATIVE ☐

006) X DOES THIS INITIATIVE HAVE A TECHNICAL LEAD OR AN ARCHITECT? ☐

007) X WHICH IS THE PRIMARY PLATFORM ON WHICH THIS APPLICATION/TECHNOLOGY RESIDES? ☐

008) X IF THE APPLICATION WERE UNAVAILABLE, WHEN WOULD PNC'S OPERATING EFFICIENCY WITHIN THE ENTERPRISE BE IMPACTED? ☐

*FIG. 21A*

| ASSESSMENT TYPE: | PROJECT | | |
|---|---|---|---|
| STATUS: | OPEN .00% COMPLETED QUESTIONS | | |
| MNEMONIC<br>AAT | APPLICATION NAME | PROJECT NUMBER<br>PRJ00004324 | PROJECT NAME<br>TEST IT MINOR - CANCEL |

| ASSESSMENT | RATINGS | LOG | APPROVALS | PROJECT INFO. |
|---|---|---|---|---|

⟳ REFRESH

LEGEND

| X = INCOMPLETE | — COMPLETE | — PENDING APPROVAL | - - - REJECTED | * APPROVED |
|---|---|---|---|---|

001) X DESCRIBE THE MAGNITUDE OF CHANGE REPRESENTED BY THIS INITIATIVE. 📄

002) X DESCRIBE THE INVOLVEMENT OF THIRD PARTIES TO THIS INITIATIVE. 📄

003) X DOES THIS INITIATIVE HAVE A TECHNICAL LEAD OR AN ARCHITECT? 📄

004) X WHICH IS THE PRIMARY PLATFORM ON WHICH THIS APPLICATION/TECHNOLOGY RESIDES? 📄

005) X IF THE APPLICATION WERE UNAVAILABLE, WHEN WOULD PNC'S OPERATING EFFICIENCY WITHIN THE ENTERPRISE BE IMPACTED? 📄
     >48 HOURS

*FIG.21B*

ASSESSMENT CONSTRUCTION TOOL

FIELD OF THE INVENTION

The invention generally relates to systems, processes, tools, techniques and strategies for assessing projects and applications. In various embodiments, the invention more particularly relates to tools for constructing assessments used to evaluate the impact of information technology projects implemented within a financial institution.

BACKGROUND

When implementing technology projects associated with new products and services, or projects involving existing applications or services, organizations may employ various risk management controls to understand the impact of such projects. Attempts are made to ensure that each new technology project adheres to the policies, guidelines, and operating practices set forth in connection with the risk management controls.

Project managers within organizations are often burdened with the need to learn and use a number of different risk assessment processes to enter information and answer questions relating to their projects. Typically, each assessment process uses a different question format with its own localized nomenclature. Assessment questions can be difficult for users to understand and may be produced redundantly and inefficiently in multiple locations. Also, there may be no capability to perform centralized reporting, and the repositories that hold the assessment information may have no facilities to maintain historical content for previous versions of an application. For example, compliance assessment processes may contain many steps, confusing relationships among different divisions of the organization, overlapping and redundant questions, and exhibit limited project manageability.

In many organizations, existing assessment processes are not validated for their intended purposes: the assessments may not yield the information which is really needed or which the organization intends to obtain. Process ownership and roles are often not clearly defined or well communicated; process dependencies and relationships are not well understood or well integrated; and processes are not sufficiently robust to be adapted to changing business needs. In addition, data obtained from existing assessment processes may not be readily usable for multiple business purposes.

When application owners and project managers are unable to comply with unreasonably onerous processes, negative consequences can arise. With respect to productivity, there may be excessive costs associated with attempting to comply with the processes, including efforts related to validate compliance against the processes, maintaining the processes and associated toolsets, and fixing problems associated with non-compliance. Remediation and rework undertaken to bring applications into compliance can be expensive and time consuming. The inability to manage application and project risk because of process inflexibility and incomplete, inaccurate, or unavailable information may increase overall vulnerability of the applications. Furthermore, when application and project portfolio information is contained in disparate systems, and data is often inaccurate or inconsistent among these systems, this may lead to inaccurate reporting and improper business decisions.

In view of the foregoing issues, enhanced systems, processes, tools, techniques and strategies are needed for constructing and performing project and application assessments within various organizations.

BRIEF DESCRIPTION OF THE FIGURES

The utility of the embodiments of the invention will be readily appreciated and understood from consideration of the following description of the embodiments of the invention when viewed in connection with the accompanying drawings, wherein.

DESCRIPTION

Figure 1:
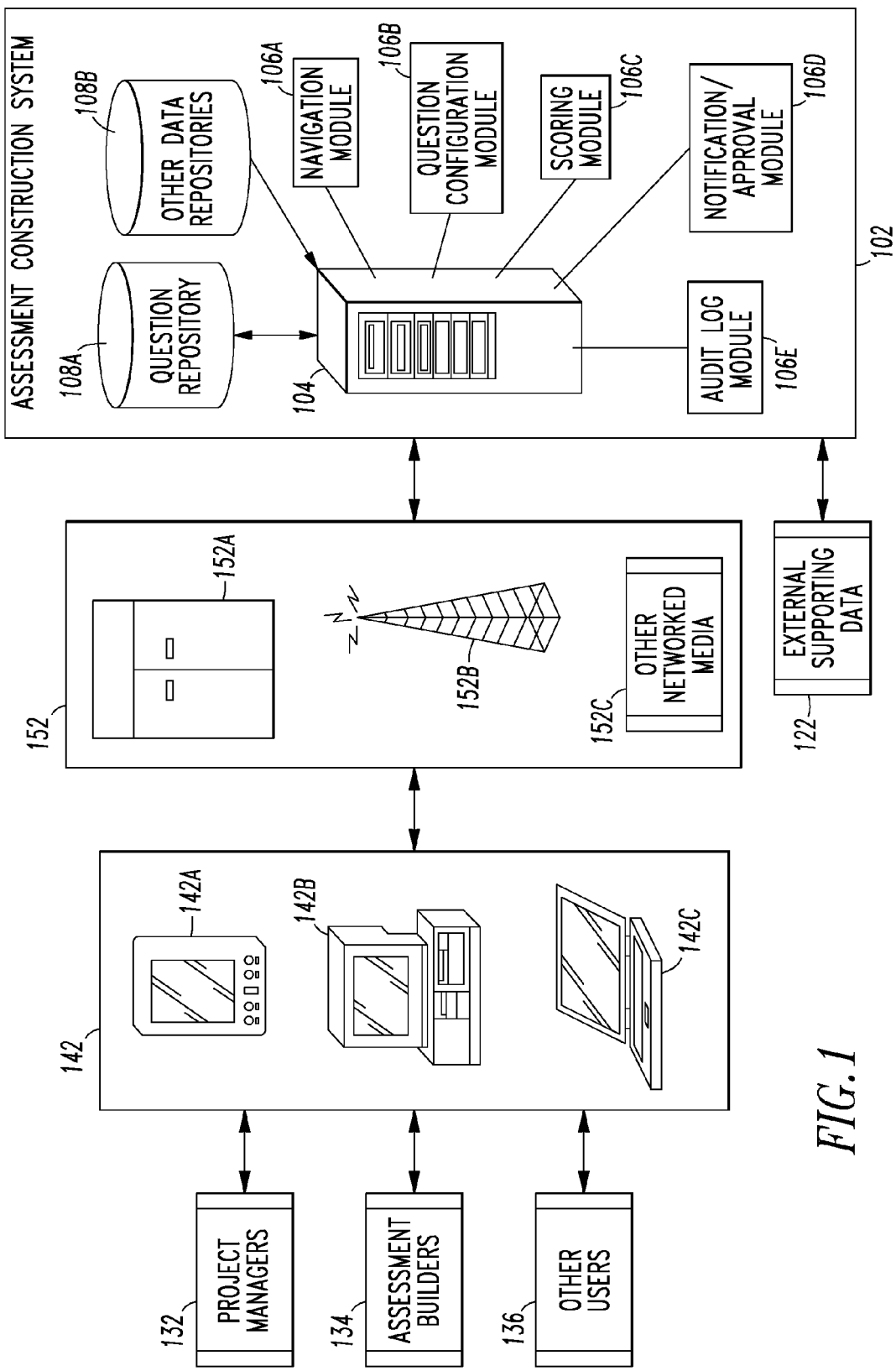
FIG. 1 schematically illustrates a computer system architecture illustrating examples of aspects of an assessment construction system structured and configured in accordance with various embodiments of the invention; and, FIGS. 2A through 21B include screen displays illustrating examples of various aspects of the assessment construction system and its associated process flows described herein.

Embodiments of the invention provide enhanced processes, methods, tools, strategies, and techniques for more effectively and efficiently constructing assessments for managing, processing and analyzing assessment data. Such assessment data may be associated with projects, applications or other operational aspects of various organizations, firms or businesses, including financial institutions. For example, the applications may include information technology projects or initiatives implemented within an organization. Various embodiments of the invention can facilitate the collection of self-assessment survey data relating to risk, technology, environment, policy, and other areas relevant to the operation and function of entities which are amenable to surveys or assessments.

Embodiments of the invention can be configured to reduce the number of applications and processes that project managers within an organization need to interact with, while retaining the ability to capture and use application and project compliance-related information. In various embodiments, integration of project identification and management databases, mnemonic management systems, compliance databases, and production turnover management databases can be promoted. In addition, certain embodiments of the invention may be configured to supplement or substantially replace applications used for application risk ratings, technology capability and impact assessments, information technology project validation analyses, enterprise vendor management, or technology risk management. Examples of the data that may be captured by these applications include information related to risk management, information security, business resiliency, architecture evaluation, project governance, records retention, and functional impact analysis, among others.

Practicing embodiments of the invention may allow an organization to add new work flows, new branching, approval chains, questions, scorings, rankings, and ratings, without significant programmer involvement. Through use of various embodiments, risks associated with new projects can be mitigated, appropriate alternative solutions can be considered, appropriate methodology for time and cost estimation can be validated, and conformity of a proposed solution to established architectural operating practices can be evaluated. As a process, embodiments of the invention can be used to improve decision confidence and speed, as well as promote corporate objectives relative to information technology architecture, tools, technical patterns, security, risk, and costs.

As applied herein, the aspects of a business entity to which assessments can be applied can be considered assessment process categories of the entity. For example, one such category may be an application risk rating (ARR) process which requires completion of a risk-rating questionnaire as part of the initial implementation process for an application. A rating or score under the ARR process might involve assessing whether a new application implicates a set of tools and processes around compliance with Sarbanes-Oxley ("SOX"), for example, or whether data privacy issues have been addressed. Another example of a category is a technology capability assessment ("TCA") process. The TCA process evaluates conformance of an application to a set of predefined controls applicable to high-risk applications. The TCA process may address who is allowed to access data within an application, how often the data can be accessed, what users have passwords, and where the data is stored. Another example of a category is a business resiliency process which is intended to ensure that the entity can continue to provide key and critical business services in light of negative events or circumstances. A technology risk management ("TRM") process can be employed as a control framework and governance process to assess risk for technology-related initiatives. For example, one question asked during the TRM assessment process might be: does this new initiative expose the organization to any possibility of a transactional fraud charge? An enterprise vendor management ("EVM") process may apply a set of procedures and policies for compliance assessment when a vendor or other service provider is engaged in an information technology project of the organization. A technology impact analysis ("TIA") process can be used to assist with development of a business resiliency plan. The TIA process may take into consideration business functions, technology, human capital and the processes that support a critical business service. In the TIA process, a resiliency rating can be applied to each of these components to develop a composite score demonstrating the current resiliency status for a particular initiative. The TIA process helps to identify the potential impact of unavailable applications or systems on the business, and highlights which technology is most critical, A TIA assessment can assist in determining the recovery capabilities and requirements for business resumption of an organization. For example, one question asked during the TIA assessment process might be: if the application is unavailable for X number of hours, when it will it start affecting management of the financial infrastructure of the organization?

FIG. 1 schematically displays an assessment construction system 102 configured and programmed for constructing assessments that may include risk assessments, for example, or other assessment process categories that evaluate many different operational aspects of an entity. As applied herein, assessments may be associated with application level or project level evaluations. In general, one or more lower level projects may form the components or sub-parts of a comparatively higher level application. At times herein, the terms "project" and "initiative" may be used synonymously.

The assessment construction system 102 may include a transaction processor 104 and one or more modules 106A-106E that perform various functions within the system 102. The processor 104 may be embodied as a computer system, for example, such as a server or web server. The modules 106A-106E may be embodied as software, a device, or another apparatus capable of receiving and processing instructions that can be implemented by a computer system. In addition, the system 102 may include one or more data repositories 108A-108B for storage and retrieval of assessment-related data processed by the system 102.

In various embodiments, the system 102 may include a navigation module 106A programmed to display various applications or projects for which assessments are under construction. For example, as shown in the screen display of FIGS. 2A-2B, the navigation module 106A can be programmed to display a list 202 of current applications and projects for which assessments have been created or for which assessments are in process, including details 206 of the status and degree of completion of each assessment. In an organization, users such as application system managers or project managers may take surveys or assessments, while other users such as risk managers, security managers, or privacy officers consume the data supplied from conducting the assessments. Such users can access various parts of the navigation module 106A to obtain desired data or functionality. An assessment type 204 determines whether or not the assessment is at an application level or a project level. The type 204 acknowledges that assessment questions can be answered at a project level while not answering certain application-level questions that have been addressed previously. This permits a project manager, for example, to not be burdened with knowing how to answer and re-answer application-level questions that have been vetted during prior establishment of an application. The project manager may enter answers related to a change in production for a systems implementation in a financial institution, for example, without worrying about an application-related issue such as fraud arising from the activities of the entire organization. Such application-level questions may be pre-populated with answers, which can be locked to resist alteration by subsequently conducted project-level assessments. In certain embodiments, the project-level assessment may be configured to require certification or confirmation from a user that one or more application-level answer remains valid. For example, as projects are applied against an application, it may be desirable to know if a new project has affected any of the underlying facts or circumstances that might require re-evaluation at the application level. In various embodiments, an assessment may be configured to cause the system 102 to initiate a re-evaluation of an application-level assessment based on entries made within a project-level assessment.

With reference to FIGS. 1 and 3A-3B, the system 102 may include a question repository 108A programmed for storing one or more questions and/or answers that can be selected as part of constructing an assessment or survey in connection with a question configuration module 106B. Other data repositories 108B may be employed for storing different aspects of assessment configurations, answers, or questions. FIGS. 3A-3B include a screen display illustrating a question list 302 and an assessment template 304, wherein answers to the various listed questions can be viewed or selected. Various aspects of the questions can be configured in different ways during the assessment construction process. The system 102 can be used to populate the question list 302 and the assessment template 304 with configurable questions and answers related to specific kinds of assessments.

By way of example, FIG. 4 illustrates details of a question ("Describe the involvement of third parties to this initiative") 402 that can be configured in accordance with embodiments of the invention. The survey type 404 for the question may be designated as "application" or "project" level, as shown, depending on whether the question is applicable at an application level or a project level. A question group 406 can connect the question to a group of multiple questions. In certain embodiments, the assessment can be configured such that a combination of answers selected within the question group 406 will trigger presentation of another question or group of questions within the assessment. A purpose 408 for the question may be included, which may include a text explanation of why the question is helpful for a given assessment. In this example, the question 402 has been associated with the potential answers 410, as shown.

Figure 5:
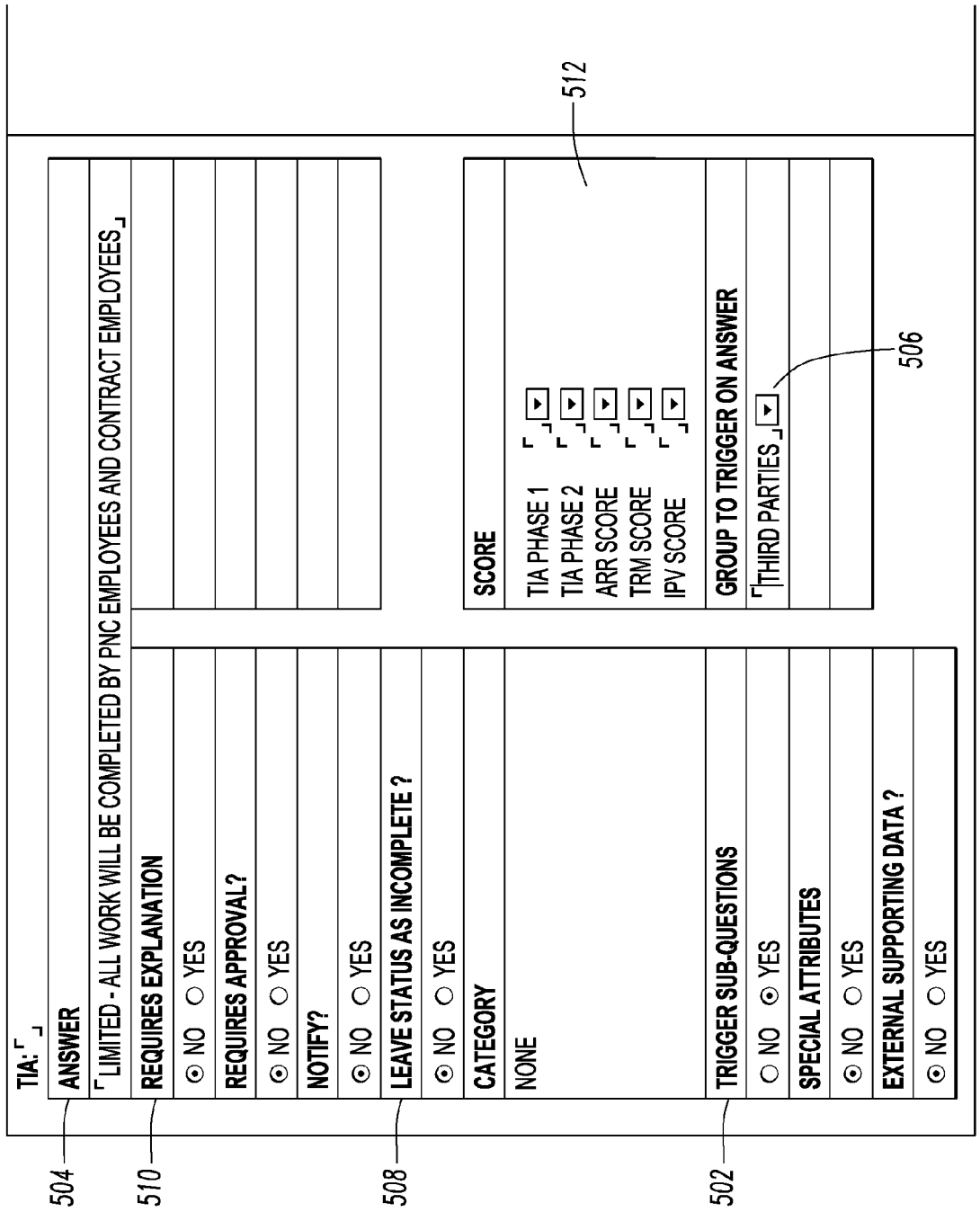

As illustrated by the example answer details of FIG. 5, specific answers to questions can be configured in various ways. In certain embodiments, a trigger sub-questions selection 502 can configure the answer 504 to an individual question (i.e., in this example, "Limited—all work will be completed by PNC employees and contract employees") to trigger presentation of a further question or group of questions. In the present example, the "Third Parties" question group 506 is triggered if the answer is selected. FIG. 6 illustrates details of the "Third Parties" question group 602, including its trigger type 604, which indicates how the group is triggered. In the present example, the question group 602 is triggered by selection of an answer (i.e., in comparison to a scoring category, as described in more detail below).

With reference again to FIG. 5, a "Leave Status as Incomplete" designation 508 can be provided to connect a task to answering the question. In certain embodiments, the assessment may not be considered complete until the task is accomplished. This feature represents a methodology of completing certain requirements before the whole assessment can be considered complete. For example, selecting the answer may require completion of certain forms or other protocols external to answering questions in the assessment itself, but which are nonetheless related to an objective of the assessment. In addition, the answer may be configured to require a detailed written explanation, such as by selecting the "Requires Explanation" indicator 510.

The system 102 may also include a scoring module 106C that can be programmed to connect answers for assessment questions to one or more category rating systems for evaluating the criticality or applicability of a particular operational category of the entity. For example, a technology impact analysis operational category may include a score that assesses the impact of system failure on business resiliency. With regard to a financial institution, scores can provide an indication of the criticality of the impact on the national financial infrastructure, enterprise-wide, or for a particular line of business. It can be appreciated that the answer to any single question may factor into the category rating systems for multiple categories. The system 102 can be used to create a configurable multi-purpose assessment scoring system. As assessments are completed the system 102 can provide the ability to rate various outcomes. For example, if the answer to a particular question is "yes", then a business resiliency assessment category may be assigned a numeric score, while an information risk category might be assigned a different score. These scores contribute to the overall business resiliency rating and the overall information risk rating, respectively. As shown in FIG. 5, a category rating system indicator 512 determines which rating systems will be impacted based on answers selected for a particular answer 504. FIG. 7 includes a summary, for a given application, of the category rating systems 702 implicated for that application, including a score 704, an active rating 706 (i.e., the developing rating as the assessment is underway), and an approved rating 708. The approved rating 708 may limit the level that the active rating 706 can achieve before an approval authority is notified or other approval is required (see below).

Figure 8:
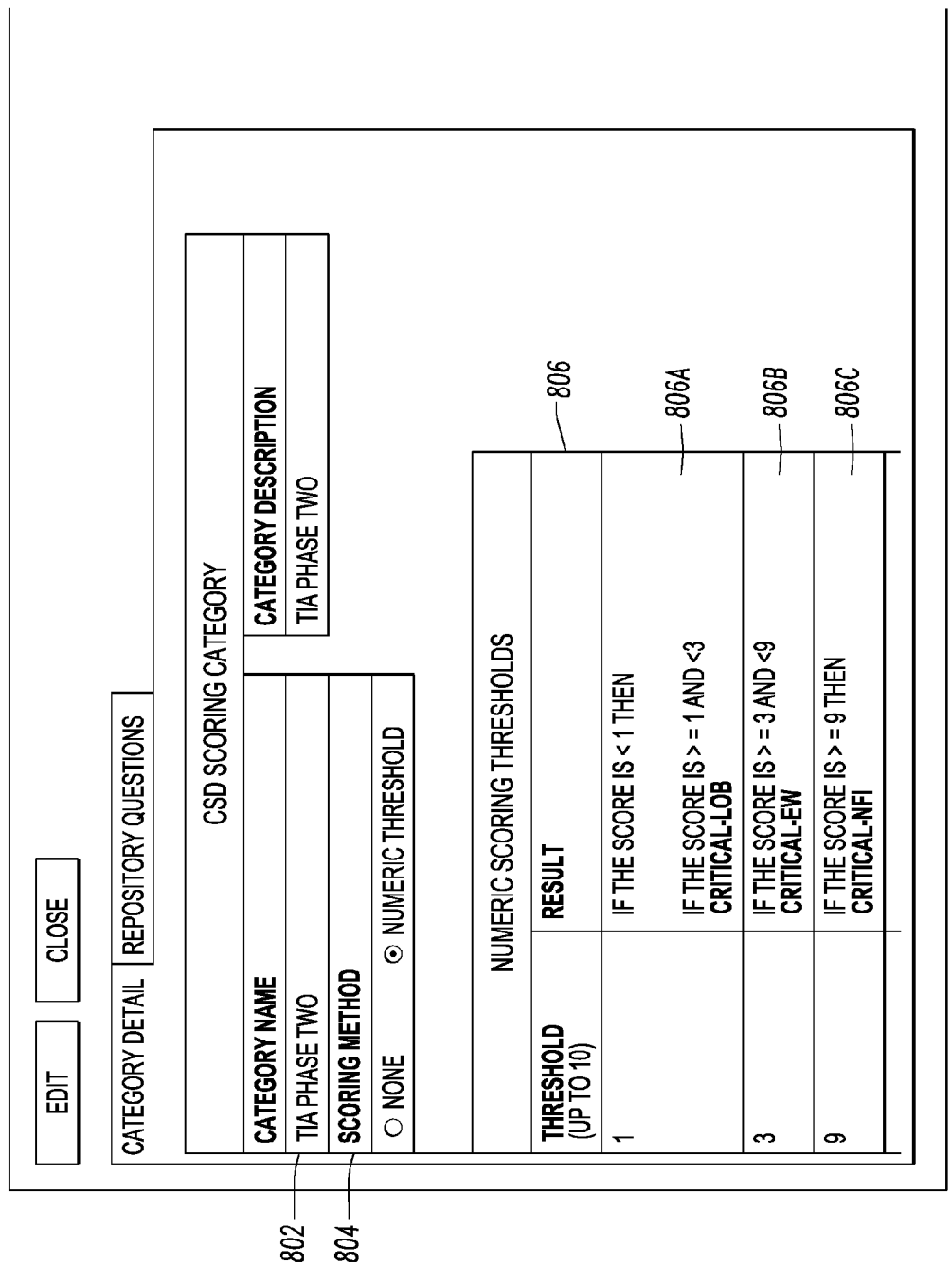

FIG. 8 illustrates various features of an example of an assessment process category 802 (e.g., "TIA Phase 2"). A scoring method indication 804 can be employed to designate a numerical threshold for scoring with the category rating system, wherein the threshold determines the criticality of scores for the category. A table of scoring thresholds 806 demonstrates at which score the category becomes critical to a line of business ("LOB") 806A, on an enterprise-wide basis ("EW") 806B, and at a national financial infrastructure level ("NFI") 806C. The screen display of FIG. 9 demonstrates how presentation of a group of questions 902 (e.g., "TIA Phase 2") can be triggered based on the score achieved in a category rating system 904 (e.g., "TIA Phase 1"). As noted above, applications can have projects, and projects can have assessments. In addition, an application can have an overall assessment, and as projects within that application undergo assessment and scoring, the score or criticality rating may change at the application level. For example, an application rating could change from a non-critical to a critical application by the impact of a single project, or by a single question or component of that project. The screen display of FIG. 10 illustrates various examples of category rating systems 1002 and the score methods 1004 that can be applied to each category rating system.

The system 102 may further include a notification/approval module 106D that can be programmed to allow a user to configure a notification scheme for approval authorities or their delegates in connection with answering an assessment question. For example, if the answer to a question involves confirming that a project will expose a financial institution to fraud, then the assessment can be configured to send a notification to the corporate fraud and forensic department of the institution. In certain embodiments, the assessment can be configured to provide advanced warning that such a notification will be sent upon answering the question. For example, the warning announcement may indicate to the user that, "If you answer yes to this, an authority will be notified and your answer will not be accepted until the authority accepts the answer." Notification activity can be tracked on an individual question-by-question basis, and appropriate approval chains can be instituted to promote satisfactory agreement prior to implementation of an application or initiative. With reference to FIG. 11, various roles 1102 can be created in the system 102 for notification and/or approval authority purposes. In various embodiments, the notification role may be defined as the name of individual (e.g., "John Smith"), or as a title or position within the organization (e.g., "Chief Information Officer"). FIG. 12 includes details associated with one example of a notification role.

Figure 16:
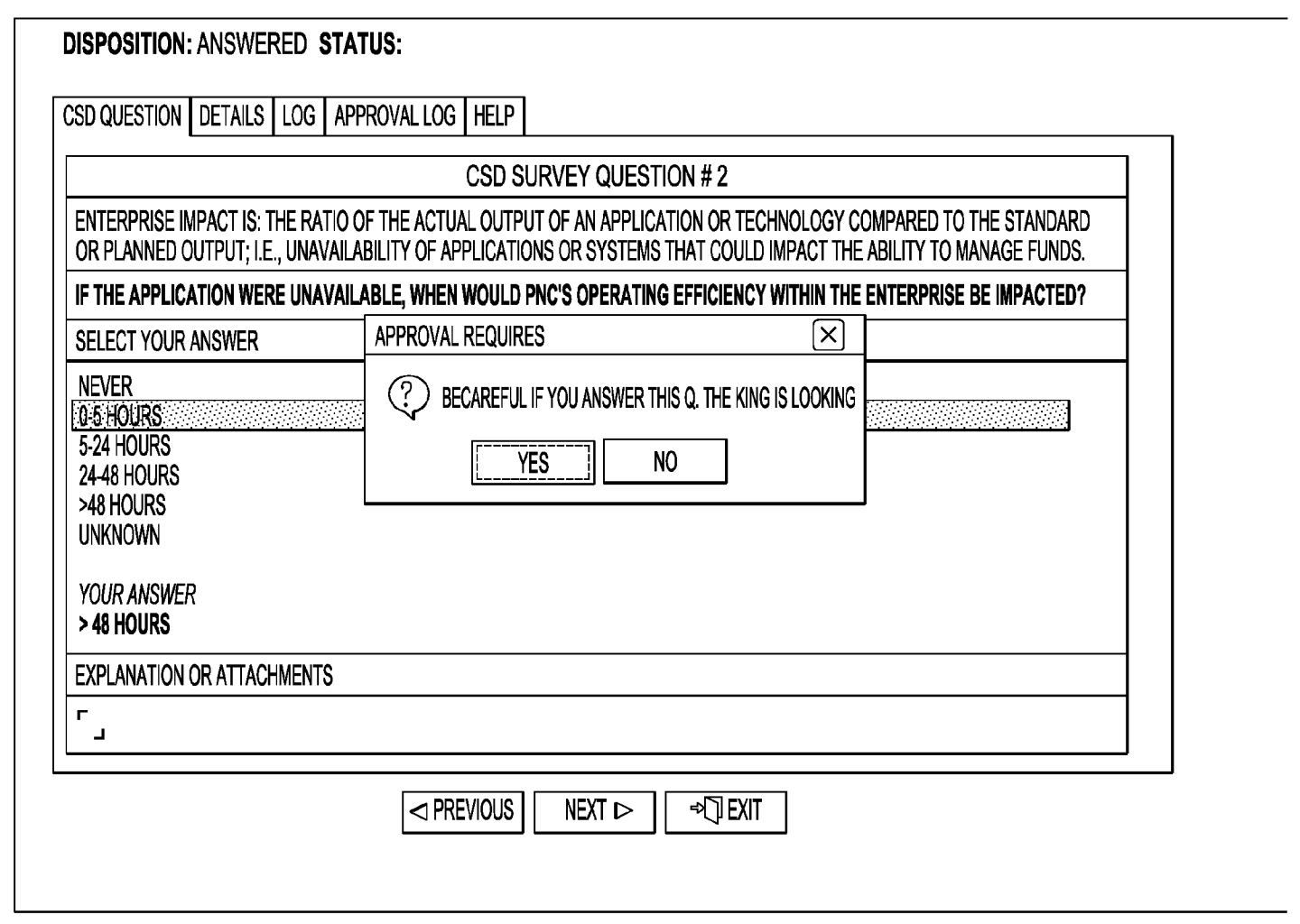

With respect to approval by various approval authorities, such approval can occur on a question-by-question basis, an application-by-application basis, a project-by-project basis, or for approval of an assessment after construction but prior to implementation. Approval may be granted (or denied) through use of e-mail communications, for example, or by direct access of the system 102 by the approval authority. As shown in the screen display of FIG. 13, the assessment can be configured to require approval at multiple management levels within the organization. For example, at a first level, the project manager may need to approve; at a second level, the application system manager may need to approve; at a third level, the system director may need to approve, and so forth. In various embodiments, approval authority may be delegated to one or more other individuals or positions within the organization. The screen display of FIG. 14 illustrates a tool for delegating approval authority. The screen display of FIG. 15 includes a summary of approvals received and entered for a given assessment. The screen display of FIG. 16 illustrates a communication that may be presented to a user upon selection of an answer for which notification and/or approval is required.

In various embodiments, questions or answers included in an assessment may be configured with one or more attributes by which questions or answers can be categorized for subsequent querying or reporting. For example, one question in an assessment may inquire about the use of offshore resources for an initiative, or whether a project will cost in capital expenditure over a predefined limit. Assigning an attribute facilitates subsequent queries by allowing an inventory of projects or applications to be grouped or displayed by that attribute. For example, all questions related to offshore operations can be assigned to the same attribute and can accordingly be queried or grouped by that attribute. FIG. 17 illustrates examples of attributes 1702 that can be assigned to a question. For example, for the AAT application, in connection with an affirmative response to the question "Does your application contain financial information?" the AAT application mnemonic is included under the financial attributes section. FIG. 18 includes an example of how projects and applications can be grouped and displayed in accordance with assigned attributes 1802.

In various embodiments, an assessment may be linked for communication with one or more sources of external supporting data 122. For example, data and other information may be communicated between the assessment and one or more files, databases, web sites or other data sources. For example, an assessment may be configured such that selecting a certain answer causes pre-population of data into the assessment.

In various embodiments, an audit log module 106E may be employed in the system 102 to track how, why, when and by whom an assessment has been changed. The screen display of FIG. 19 includes an example of the operation of the audit log module 106E in accordance with certain embodiments of the invention.

In various embodiments, the system 102 may communicate with project managers 132, assessment builders 134, or other users 136, either internal or external with respect to the business entity. As shown in FIG. 1, users may communicate with the system 102 with various types of access devices 142 through many different kinds of communication media 152. Examples of access devices 142 include portable devices 142A (e.g., phones, smart phones, personal data assistants (PDAs), and the like), computer systems 142B, or portable computer systems 142C (e.g., laptops, notebooks, and the like). Examples of communication media 152 include wireline connections 152A, wireless connections 152B, or other networked media 152C (such as satellite connections or intranet connections).

Embodiments of the invention can be used to provide a structure for storing technology risk assessment data while offering a platform for applications requiring similar functionality. The framework of these embodiments can give administrators the ability to create and attach risk questions to an assessment template without significant computer programming resources. This framework will also provide a way to store and track risk answers and provide the ability to add scoring and workflow algorithms. Once an assessment template is defined, end users can address appropriate risk questions and submit answers to a configurable list of owners for approval. Examples of questions that may be presented to a user during an assessment are included in the screen displays of FIGS. 20A-20E. Examples of assessment status summaries that may be accessed by project managers, for example, are included in the screen displays of FIGS. 21A and 21B.

Embodiments of the invention can also be used to generate a process for managing the creation and approval of new questions and assessments. The assessment construction system can include a question "palette" such that questions and their associated answers can be "painted" onto an assessment canvas. As questions are entered onto to an assessment template, they may have the ability to be linked to the answer of an existing question. That is, certain questions may only appear if "parent" questions are answered in a particular manner. Such linking functionality may be configured to work on an individual answer level as well as at a multi-answer level, or for a combination of answers. In addition, the system can possess the ability to link a group of questions to an answer or a combination of answers.

In various embodiments, role-based approval for new control questions or answers can be implemented into the assessment. As new questions and answers are entered into the repository, individual questions (and their potential answers) may be dynamically routed to a configurable list of approvers based on user defined categories. For instance, all business resiliency question/answer pairings can be routed to a business resiliency approval chain. In addition, the system may have the capability to allow for role-based approval as questions are added to a template. Questions may not be necessarily automatically added to a template without approval to promote overall consistency and to reduce the possibility of ambiguous or redundant questions. Roles can contain one or more individual or groups of individuals. In certain embodiments, the system 102 may employ routing rules to allow for assignment of multiple roles in a single approval chain and to enable work on an assessment serially as well as in parallel. Approval and rejection processing can be configured to notify the submitter as answers, questions, or assessments are reviewed, and perhaps including whether or not they have been accepted or rejected.

The system 102 may also provide an inventory of available questions and answers, including indicators that identify which questions need to be addressed and by which evaluators. An assessment can be configured to allow users to address individual questions directly without having to traverse through preceding questions. As questions are addressed, the user may be permitted to traverse to the next or previous question without returning to the assessment question summary.

In certain embodiments, the system 102 can be used to configure assessments that provide the ability to enter and link an issue (e.g., instead of a project) to an application. As such issues are entered, free format text and configurable workflow attributes can be entered so that the issues can be routed for approval and ultimate resolution. Issue views can also be displayed to users so that the issues can be tracked and resolved.

It can be seen that multiple projects can be processed simultaneously and can be audited separately on an initiative by initiative basis. Each initiative may have its own percentage completion indicator. When all questions for the assessment for the initiative have been answered and/or recertified, then that initiative can be marked 100% complete, providing that any initiative level questions are also answered. The initiative can then be stamped with the application rankings and ratings at the time of completion. This feature provides an incentive for project managers to review how "child" projects affect their corresponding "parent" applications.

Once a project assessment is 100% complete, or otherwise substantially complete, the ability to submit the assessment for approval can be enabled. For example, notifications such as e-mail communications including project "approve" or "reject" indicators may be transmitted to a submitter. An assessment may be configured such that if a project has already been approved then it cannot be resubmitted. In certain embodiments, if a project has been approved but is subsequently updated, then the project may be removed from approved status and can be subject to a re-approval process. Master application updates (e.g., from application level questions on a project) can be deferred until the project is approved. If any master application features are changed, then the application master can be configured to require re-approval.

In one example of operation of certain embodiments of the invention, when a user answers a question, if the answer requires approval then a dialog box can be displayed with text of an alert message. The alert message dialog box can contain two function buttons: one for the user to "submit" the answer for approval, and another to cancel the current answer selection. If the user selects the "submit" option, then the assessment may be updated to reflect the answer, but the question may remain marked with an indication (e.g., a red "x") that the question is still considered incomplete. The question may also be marked (e.g., with a "?") to indicate that the answer is under review. In addition, if the question is an application-level question, then the application master record may not be updated to reflect the new answer until the new answer is approved by any required approval authorities. Also, in this example, another action that may occur when the user selects "submit" is communication of an email to the approval authorities. The communication may include sufficient information to approve or reject the request, including but not limited to, the name of the submitter, the application name, the project name (if applicable), the question, and/or the answer. If the approval authority rejects the request, then the question may remain marked with the "x" indicator along with an additional indicator to reflect the rejection decision (e.g., a "thumbs down"). If the approval authority accepts the answer, then the question may be marked with a green check mark and an accompanying "thumbs up" indicator, for example. In either or both events, the action of the approval authority may be communicated to the submitter. If the question is at the application level, then the new answer may be reflected or recorded in the master application record.

In various embodiments, the system 102 may be configured to incorporate a question locking mechanism that limits maintenance of application-level questions. For example, multiple project assessments may not be permitted to change a locked application-level question until the application has been approved. For example, suppose that application AAA has an approved assessment and the answer to application question 1 is a "yes" selection. Project 123 which is a child of application AAA changes the answer of question 1 to a "no" selection. At that stage, an unapproved version of the assessment for application AAA can be generated and Project 123 would possess the lock for question 1. Project 234, which is also a child of application AAA, cannot change the answer to application 1 while it is locked in this manner. However, Project 234 may be able to certify that its initiative does not affect the particular aspect of the application. Once the application is approved, then the question level locks can be removed.

In certain embodiments, a project-level assessment can be configured to inherit the application-level assessment tree structure as it exists in its current state, meaning that all previously answered questions for the application are certified through the project-level assessment. If a project-level assessment is created and no application-level assessment exists, or an incomplete application level assessment exists, then application-level questions answered for the first time on the project level assessment can be configured for display the next time that the application-level assessment is accessed.

The inventors have recognized that multiple validation processes can be owned, governed, and managed by separate entities throughout the same business. As a result of separate management, the various processes often overlap in functionality and goals, and end users can become confused as to which process applies and under what circumstances. Additionally, inefficiency may arise from the duplication of work by both the owners and the users. Applications, initiatives, and projects may flow through a number of separate and distinct processes and tools to ensure compliance with guidelines, policies, operating practices, rules or laws. These processes may contain overlapping goals, questions, and tasks, yet may be managed and implemented independently. Data communicated between systems may not be valid. Interfaces between or among systems may change or grow but may not be well understood or documented. Critical business decisions may be made using the content in these databases. In summary, since assessment processes are not managed centrally, there is a potential for indefinable or hidden problems.

Embodiments of the invention can provide many benefits to an organization. For example, the benefits of a consolidated process include improved understanding by process owners and end users of what needs to occur, when it needs to occur, and why. There may be a reduction in the number of assessment questions and collected data points. Cycle time required to fulfill validation processes may be decreased, and a consolidated reporting capability can be created. There may also be a reduction in remediation efforts due to exceptions to policy and standards, and reduced audit exceptions can help to increase audit compliance. There may be reduced maintenance costs for maintaining a centralized process versus multiple individualized processes. Business decisions made by an entity can be based on a more accurate view of the application and project portfolio. A consolidated assessment process can assess the existing, identified validation processes and consolidate them into a non-overlapping, integrated, event-driven process that promotes appropriate operating practices are implemented by the right resources, at the right time, with the least manual activity.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information, It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), Moss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components. For example, the transaction processor or the question repository may employ such components. Also, it is contemplated that various users of the assessment construction system may interact or communicate with the system in a variety of ways. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A method for constructing an assessment, the method comprising:
    receiving with an electronic transaction processor including a computer system and at least one data storage medium:
    an assessment type for an assessment to be constructed,
    at least one question associated with the assessment,
    at least one answer associated with the question,
    a category rating system indicator configured for applying a score associated with at least one of the answers to multiple assessment process categories of a business entity;
    in association with receiving the assessment type for the assessment to be constructed, determining with the processor whether the assessment is at a project level or an application level; and
    constructing the assessment in response to the information received by the electronic transaction processor,
    wherein the assessment is configured to determine whether the project level assessment affects the application level assessment by initiating a re-evaluation of an application-level assessment based on entries made within a project-level assessment, for confirmation that an application level answer remains valid.

2. The method of claim 1, further comprising displaying a list of assessments including a status and degree of completion for each assessment.

3. The method of claim 1, further comprising configuring the assessment to pre-populate application-level questions previously answered during establishment of the application.

4. The method of claim 1, further comprising configuring the assessment for locking at least one application-level question to resist alteration of an answer to the application-level question.

5. The method of claim 1, further comprising configuring the assessment for requiring confirmation that an application-level answer remains valid.

6. The method of claim 1, further comprising configuring the assessment to connect the question to a group of other questions.

7. The method of claim 1, further comprising configuring the assessment to trigger presentation of at least one subsequent question in response to a combination of answers selected within the assessment.

8. The method of claim 1, further comprising configuring the assessment to trigger presentation of at least one subsequent question in response to a score calculated for at least one category rating system.

9. The method of claim 1, further comprising configuring the assessment to connect at least one task to a completion status of the answer to at least one question.

10. The method of claim 1, further comprising configuring the assessment to limit the level that an active rating can achieve for an assessment process category associated with the assessment before an approval authority is notified.

11. The method of claim 1, further comprising receiving a notification scheme for at least one approval authority for the assessment.

12. The method of claim 1, further comprising configuring the assessment to provide warning that notification will be sent to an approval authority in connection with answering the question.

13. The method of claim 12, further comprising tracking the sent notifications on a question-by-question basis.

14. The method of claim 1, further comprising configuring the assessment to require approval of at least one question or answer.

15. The method of claim 14 further comprising configuring the assessment to require approval of the answer at multiple management levels within the business entity.

16. The method of claim 1, further comprising configuring at least one question or answer with an attribute for categorization of the question or answer.

17. A method for constructing an assessment, the method comprising:
    receiving with an electronic transaction processor including a computer system and at least one data storage medium:
    an assessment type for an assessment to be constructed,
    at least one question associated with the assessment,
    at least one answer associated with the question,
    a category rating system indicator configured for applying a score associated with at least one of the answers to multiple assessment process categories of a business entity;
    in association with receiving the assessment type for the assessment to be constructed, determining with the processor whether the assessment is at a project level or an application level;

configuring the assessment to trigger presentation of at least one subsequent question in response to a score calculated for at least one category rating system;
configuring the assessment to provide warning that notification will be sent to an approval authority in connection with answering the question; and,
constructing the assessment in response to the information received by the electronic transaction processor, wherein the assessment is configured to determine whether the project-level assessment affects the application level assessment by initiating a re-evaluation of an application-level assessment based on entries made within a project-level assessment, for confirmation that an application-level answer remains valid.

\* \* \* \* \*